Nov. 10, 1942.    J. McELGIN    2,301,433
WATER TYPE COOLING (OR HEATING) SURFACE
Filed June 27, 1940    3 Sheets-Sheet 1
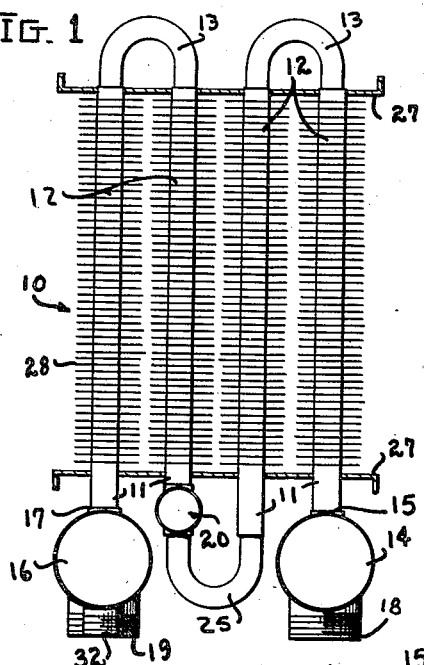
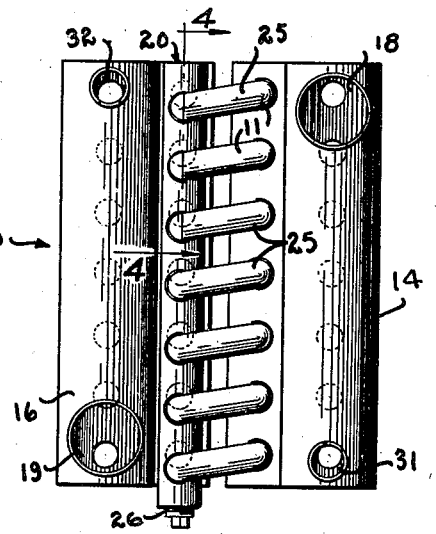
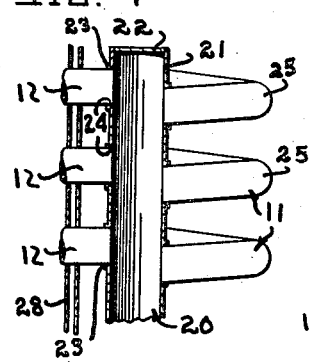
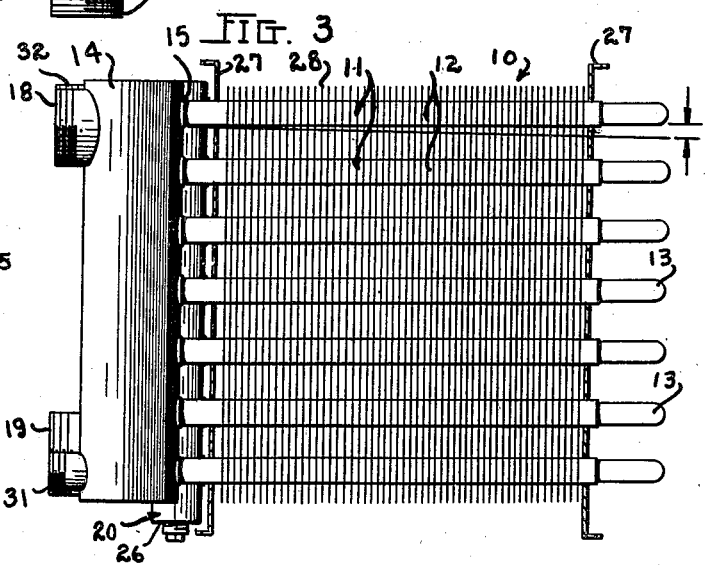
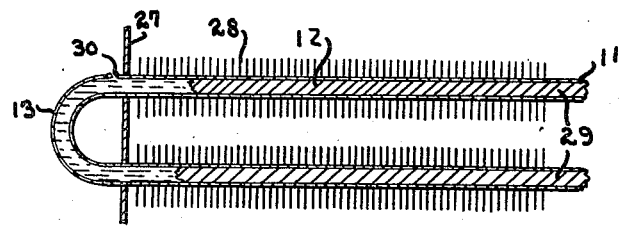
INVENTOR
JOHN McELGIN
ATTORNEYS Nov. 10, 1942.    J. McELGIN    2,301,433
WATER TYPE COOLING (OR HEATING) SURFACE
Filed June 27, 1940    3 Sheets-Sheet 2
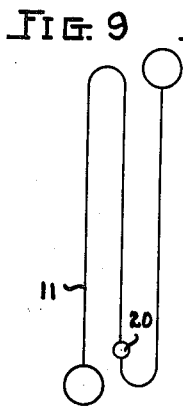
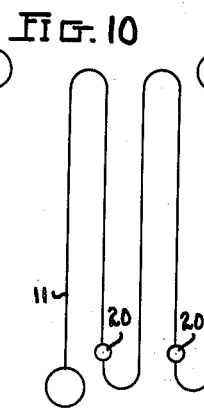
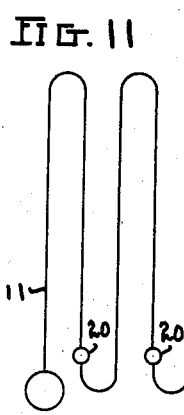
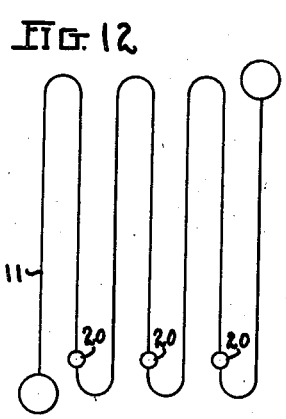
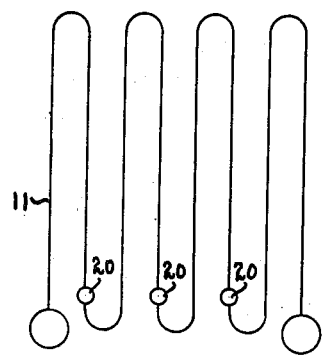
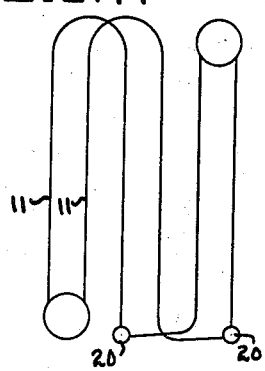
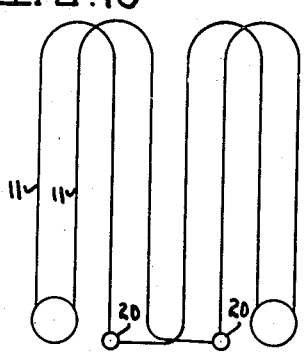
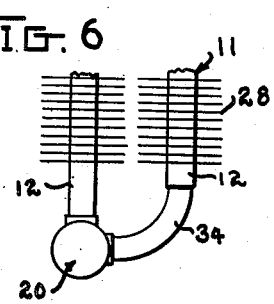
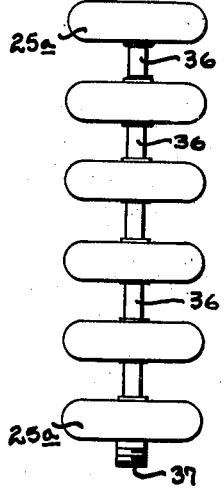
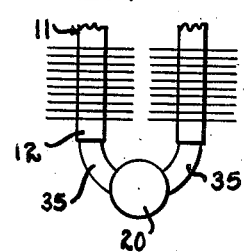
INVENTOR
JOHN McELGIN
ATTORNEYS Nov. 10, 1942.  J. McELGIN  2,301,433
WATER TYPE COOLING (OR HEATING) SURFACE
Filed June 27, 1940  3 Sheets-Sheet 3
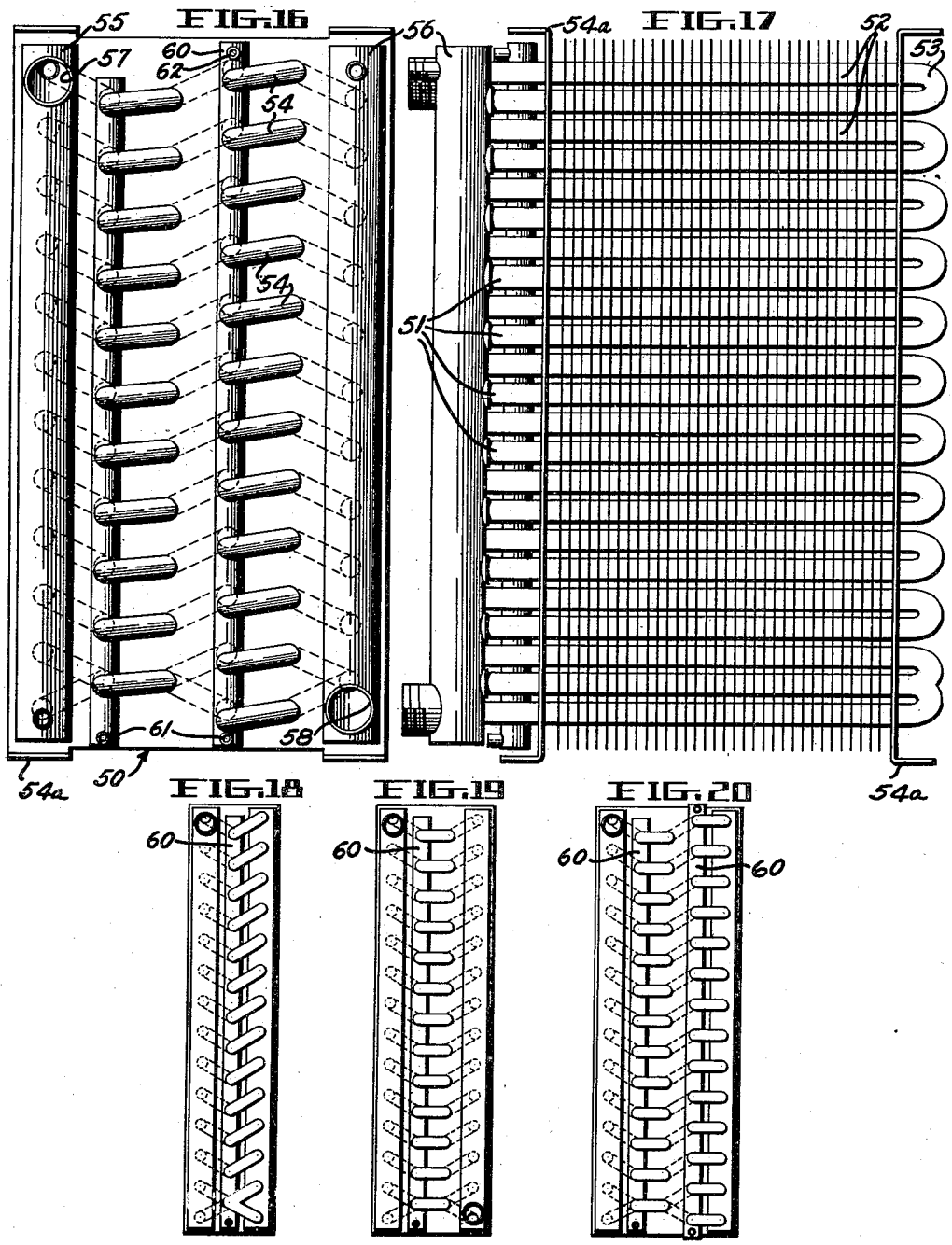
INVENTOR
JOHN McELGIN
By
ATTORNEYS Patented Nov. 10, 1942

2,301,433

UNITED STATES PATENT OFFICE 2,301,433

WATER TYPE COOLING OR HEATING SURFACE

John McElgin, Philadelphia, Pa., assignor to John J. Nesbitt, Inc., Philadelphia, Pa., a corporation of Pennsylvania Application June 27, 1940, Serial No. 342,771

3 Claims. (Cl. 257—255)

This invention relates to heat exchange apparatus, and particularly to a heat exchange coil through which a circulating fluid is adapted to be passed.

It is common practice in heating and cooling systems to use heat exchange apparatus through which a cooling or heating fluid is circulated. In the heating and cooling systems it is also common practice to use separate heating and cooling coils so that during the summer time one set of coils will be used for cooling purposes, while during the winter period another set of coils will be used for heating purposes. During the winter period the cooling coils are inactive and the fluid therein is subject to freezing if outside air below 32° should be brought in contact with the cooling coil. It is not uncommon for low temperature air to contact the cooling coil due to various mechanical failures of the heating system during the winter period. Whenever such a failure occurs freezing up of the cooling coil results with consequent damage to the fluid circulating conduits of the cooling coil or heat exchange device.

It is an object of this invention to provide a heat exchange device arranged in such a manner that fluid can be drained from all parts thereof when the device is to remain inactive.

It is another object of this invention to provide a continuous serpentine tube type of heat exchange device which is provided with means for draining liquids from the fluid trapping serpentines of the coil.

A still further object of the invention is to provide a continuous serpentine tube type heat exchange device which is adapted to be arranged in a plane inclined longitudinally from the horizontal, wherein means are provided for draining the fluid trapping serpentines of the inclined fluid conduit tubes.

A still further object of the invention is to provide a plurality of continuous serpentine type conduits each of which has a plurality of leg portions and return bend portions arranged in substantially a common plane, the plurality of conduits being arranged in spaced planar relation and having the ends thereof connected to an inlet and an outlet header, and wherein means are provided interconnecting vertically adjacent fluid trapping serpentines to provide means for draining the fluid from the serpentines.

A still further object of the invention is to provide a continuous tube type heat exchange device having a plurality of heat exchange tubes shaped in the manner of a continuous serpentine and arranged in spaced planar relation wherein a header interconnects vertically adjacent leg portions of the serpentines and cooperating return bend portions being arranged at a declined angle toward the header, whereby means are provided for draining the fluid from the return bend and cooperating leg portions of the serpentine.

Another object is to arrange the drain headers upon the heat exchange device in such a manner that each header will drain a pair of vertically adjacent leg portions of a serpentine, the serpentines being arranged in groups of pairs of leg portions and cooperating return bend portions.

Further objects and advantages will be apparent from the drawings and a description.

In the drawings:

Figure 1 is a plan elevational view of a heat exchange device incorporating features of this invention;

Figure 2 is an end elevation of Figure 1 showing the inlet and outlet headers and the drain header;

Figure 3 is a side elevation of the heat exchange device showing the degree of inclination of the conduits;

Figure 4 is a partial cross-sectional view taken along line 4—4 of Figure 2;

Figure 5 is a horizontal cross-section of one of the serpentines of the heat exchange device showing the manner in which fluid freezes therein;

Figure 6 is a top view of one of the return bend portions showing a modified arrangement of connecting the drain header between the return bend portion of the leg portion of the serpentine;

Figure 7 is a top view of a return bend portion of the heat exchange device and shows a modified arrangement for positioning the drain header within the return bend;

Figure 8 is a view representing an end elevation of a plurality of vertically adjacent return bends and a manner of connecting the return bends for draining thereof;

Figure 9 is a diagrammatic representation of a single serpentine heat exchange device of a three row type showing the positioning of the drain header therein;

Figure 10 is a diagrammatic representation of a single serpentine heat exchange device of a five row type showing the positioning of the drain header therein;

Figure 11 is a diagrammatic representation of a single serpentine heat exchange device of a six row type showing the positioning of the drain header therein;

Figure 12 is a diagrammatic representation of a single serpentine heat exchange device of a seven row type showing the positioning of the drain header therein;

Figure 13 is a diagrammatic representation of a single serpentine heat exchange device of an eight row type showing the positioning of the drain header therein;

Figure 14 is a diagrammatic representation of a double serpentine of a six row type showing the positioning of the drain header therein;

Figure 15 is a diagrammatic representation of a double serpentine of an eight row type showing the positioning of the drain header therein;

Figure 16 is an end elevation of a heat exchange device of this invention having a modified arrangement of the fluid circulating conduits which are arranged in staggered relation to each other and to the airflow through the heat exchange device;

Figure 17 is a side elevational view of the device of Figure 16;

Figure 18 is an end elevation of a further modified arrangement of the fluid circulating conduits arranged in staggered relation to the airflow through the heat exchange device;

Figure 19 is another modified arrangement of the fluid circulating conduits having the same arranged in staggered relation to the airflow through the cooling coil;

Figure 20 is still another modified arrangement of the fluid circulating conduits having the same arranged in staggered relation to the airflow through the cooling coil.

The heat exchange device of this invention is particularly adaptable for use in heating or cooling systems and more particularly in combined heating and cooling air-conditioning systems designed for both heating and cooling. It is customary to use a separate heat exchange device for heating and cooling purposes. It is also conventional to use fluids circulated through the heating or cooling heat exchange device according to the use to which the air-conditioning system is being put. During summer periods, or periods wherein cooling of air passing over the heat exchange device is required, it is customary to circulate a fluid such as cold water through the heat exchange device whereby the air passing thereover will be cooled before being circulated to the space being conditioned.

Under winter conditions the heat exchange device used for cooling will be inactive while the heat exchange device for heating will become active due to the circulation of hot fluid through the device.

Since it is conventional to bring in a certain percentage of fresh air into an air-conditioning system the air temperature thereof over the inactive cooling coil will effect the fluid therein, if fluid remains in the inactive cooling coil. If air temperature lower than 32° should strike the cooling coil the fluid therein would freeze and cause bursting of the heat exchange device. This example is mentioned in connection with the use of cold water in the cooling coil, but, of course, other fluids could be used and the temperature at which the fluid in the coil would freeze would be dependent upon the composition of the fluid.

However, during the winter use of an air conditioning system, it is desirable to drain the fluid from the cooling coil to prevent the aforementioned freeze up. Unless each individual tube of the cooling coil is drained of fluid, danger of freeze up occurs. This is particularly true where small sized tubes are used for the fluid circulating tubes of the heat exchange device, since the capillary attraction of the liquid is such that fluid tends to remain within the tubes.

To overcome the difficulty of entrapped liquid within the tubes of the heat exchange device it is proposed, by this invention, to incline the fluid conduit tubes of the heat exchange device longitudinally to cause the liquid to run toward one end of the tube. Suitable means are then provided for draining the liquid from each of the inclined conduits, and since the inclination will be sufficient to overcome the capillary attraction of the liquid the tubes will be emptied, thereby preventing freeze ups and destruction of the conduits.

In this invention the heat exchange device 10 consists of a plurality of continuous tubes 11 arranged in the manner of a continuous serpentine. Each of the serpentine shaped tubes or conduits 11 consists of a plurality of leg portions 12 joined by return bend portions 13 and 25. The leg portions 12 of the conduits 11 are arranged adjacent each other in substantially parallel relation and in substantially a common plane. These leg portions 12 are joined by the return bend portions 13 and 25, which return bends may be individual members soldered, brazed, or otherwise secured to adjacent leg portions 12. If desired, the return bend portions 13 and 25 may be continuous with the leg portions 12, being formed around a suitable radius to bring the leg portions 12 substantially in parallel relation.

The conduits 11 are connected at one end to an inlet manifold 14 as at 15, and at their opposite ends to an outlet manifold 16 as at 17. The inlet manifold 14 is provided with an inlet opening 18 through which fluid enters the heat exchange device and is distributed through the plurality of conduits 11. The outlet manifold 16 is provided with an outlet opening 19 through which the fluid passes from the cooling coil after having circulated through the fluid conduits 11 of the heat exchange device.

As thus far described, the heat exchange device is of a more or less conventional design wherein a plurality of serpentine shaped conduits are arranged in a substantially parallel and spaced planar arrangement, having their ends connected to inlet and outlet headers so that a heating or cooling fluid can circulate through the plurality of conduits in parallel relation.

In this invention, however, I provide a drain header 20 which is arranged to connect with the vertically adjacent leg portions 12 of the serpentine conduit 11. The drain header 20 is positioned in one leg of a hairpin loop of the serpentine conduit 11 so that the drain header may function to permit fluid to flow from both leg portions 12 of the hairpin loop in which the drain header is positioned. This arrangement permits the use of a single drain header for each hairpin loop of the serpentine shaped conduit 11.

The drain header 20 consists of a tubular member 21 closed at both ends, as indicated at 22 (Figure 4). The vertically adjacent leg portions 12 extend through openings 23 in the side wall of the drain tube 21 and are secured thereto by suitable soldering, or brazing, operations. A return bend 25 is adapted to have one end thereof extend through openings 24 in the wall of the tube 21, and the opposite ends thereof extend into leg portions 12 of the serpentine coil 11 whereby a hairpin loop is provided between two adjacent leg portions 12 having a drain header 20 positioned therein. The return bend 25 is not arranged in the same plane as the leg portions 12, but is arranged upon a declining angle from its point of attachment with the leg portion 12 toward its point of attachment with the drain header 20, whereby a continuous slope is given the return bend 25. The lower end of the drain header 20 is provided with an opening 26 which provides means through which liquid from the header may flow when a suitable drain plug (not shown) is removed therefrom.

When heat exchange coils of conventional type have been installed in air-conditioning systems and through which a fluid is circulated for cooling the air passing over the heat exchange coil, difficulty has arisen during the periods of low outside temperature from freezing of the liquid within the coil even though an attempt has been made to drain the liquid therefrom. This is particularly true of a heat exchange coil having the fluid circulating conduits thereof arranged in the shape of a continuous serpentine. For various reasons, liquid will become trapped within various portions of the serpentine shaped conduit and when cold air strikes the conduit the liquid will freeze therein. Most of the continuous tube type heat exchange devices consist of a plurality of leg portions interconnected with return bend portions which are supported by means of suitable end plates through which the return bend portions extend and support the various portions of the serpentine conduits in their respective spaced relations. Such a supporting plate, or bracket, is indicated at 27. The air flow through the cooling coil is directed through the fins 28 thereof and substantially between the brackets 27, whereby the cold air passing through the coil will contact the fins 28 and the leg portions 12 of the serpentine conduits 11. The cold air striking these portions first will cause the liquid trapped therein to freeze into a solid plug as indicated at 29 (Figure 5). After the liquid in the leg portion 12 of the conduit 11 has frozen, the hydraulic pressure of additional freezing of the liquid produced in the return bend 13 will increase to the rupture point of the conduit. The rupture point will always be the weakest part of the conduit and in the case of a continuous conduit the rupture point usually is just beyond the means for supporting the conduit, as indicated at 30 (Figure 5). Or, if the conduit 11 is composed of straight portions comprising the leg portions 12 interconnected with return bends soldered, or brazed, to the leg portions 12 the heat of the soldering operation tends to weaken the end portions of the leg portions 12 whereby the weakest point is then at the joint between the leg portion 12 and the return conduit 13. This point then usually becomes the rupture point for the conduit 11.

When the heat exchange device of this invention is installed in position within an air circulating system, or cooling system, the device is adapted to be positioned in a manner that the conduits 11 will be inclined longitudinally from a horizontal plane and be pitched toward the drain header 20. With a definite inclination given the serpentine conduits 11 fluid trapped within the coil would be retained therein upon an attempt to drain the same. However, the inclination given the conduits 11 and the inclination given the return bend 25 provide an arrangement whereby a continuously downwardly inclined path of fluid travel is imparted to the fluid trapped within the heat exchange device 10. The drain header 20 will thus serve to function as the draining means for a pair of horizontally adjacent leg portions 12 of the serpentine conduit 11 and for the return bend 25 interconnecting the leg portions 12. Since the conduits 11 are pitched toward the header 20 it will also be seen that the return bends 13 will also be drained of fluid through the leg portions 12 and the return bend 25.

In the structure, as disclosed in Figures 1 to 3, the outermost leg portions 12 of the conduit 11 will be drained through the inlet and outlet manifolds 14 and 16, a drain opening 31 being provided in the inlet manifold 14, while the outlet opening 19 performs the function of draining the outlet manifold 16. An air vent 32 is provided in the upper portion of the outlet manifold 16 to permit gravity draining of the heat exchange device 10. Suitable plugs may be provided for closing the drain opening 31 and the air vent 32 when the coil is in use.

The drain header 20 is so positioned within the conduits 11 that the least number of headers 20 shall be used according to the number of horizontally adjacent serpentine coils arranged within the heat exchange device. The headers 20 are always arranged at the end of the coil assuming the lower position of the angle of inclination of the heat exchange device, which is pitched toward the end thereof upon which the least number of headers will be required to drain each of the legs of the serpentine loops. As heretofore mentioned, each of the drain headers is arranged to permit liquid to drain from an adjacent pair of leg portions of the serpentine loops, or one hairpin turn thereof. As disclosed in the diagrammatic representations of the serpentine conduits for the heat exchange device, the conduits are all arranged to be pitched toward the drain headers 20 and, as will be noticed, a drain header is provided on every other adjacent leg portion of the serpentine conduits 11, whereby each header serves to drain a hairpin loop of the conduit 11. It will further be noticed that the drain headers are arranged at the end most favorable to the use of the least number of drain headers according to the number of horizontally adjacent leg portions provided in the heat exchange device.

In Figures 14 and 15 there is shown a diagrammatic representation of a double serpentine heat exchange device wherein the serpentine shaped conduits 11 are arranged in pairs and in horizontal parallel adjacent relation. In these arrangements it is also noticed that the drain headers 20 are positioned at the end of the coil requiring the least number of drain headers according to the number of horizontally adjacent leg portions of the serpentine conduits 11.

It is, of course, understood that the drain header 20 may be used in connection with either a single serpentine conduit arranged in a plane and declined upon an angle toward the header 20, or the arrangement may be used in connection with a plurality of serpentine conduits 11 which are arranged in spaced parallel planar arrangement, wherein the header 20 will then interconnect the plurality of vertically adjacent leg portions arranged in vertical alignment, whereby the header will serve a plurality of vertically adjacent hairpin loops formed by the leg portions 12 and the return bends 13 and 25.

It is thus seen that by this invention I provide a continuous tube type of heat exchange device wherein a plurality of conduits are provided in the shape of a continuous serpentine. The cooling coil formed by the plurality of serpentines is purposely pitched toward one end thereof and means are provided for draining the various serpentine portions of the cooling coil. The arrangement of this invention insures that the coil will be drained under all circumstances.

In the form of the apparatus, as disclosed in Figures 16 to 20 inclusive, there is shown a heat exchange device wherein the fluid circulating conduits are arranged in staggered relation to the airflow passing through the heat exchange device. This arrangement is advantageous in that it permits the air passing through the heat exchange device to more intimately contact the heat exchange surfaces of the fluid circulating conduits. The heat exchange devices, having the fluid circulating conduits arranged according to the disclosures 16 to 20 inclusive, are also constructed in a manner whereby the individual serpentine conduits may be constructed from a plurality of leg portions which are interconnected by means of suitable return bend connections.

In the apparatus as disclosed in Figures 16 and 17, the heat exchange device 50 consists of a plurality of individual serpentine conduits 51. These conduits 51 are composed of individual leg portions 52 which are interconnected at one end thereof by means of return bends 53 and at the opposite ends by the return bends 54. To provide a single serpentine conduit a plurality of leg portions 52 are interconnected by the return bends 53 and 54, the leg portions 52 being arranged in substantially parallel alignment. However, as disclosed in Figure 16, the leg portions 52 of parallel adjacent hairpin loops of the serpentine conduit 51 are arranged in offset planar relation whereby one of the leg portions 52 will lie in a plane above the adjacent leg portion so that air passing through or across the serpentine conduit 51 will strike each of the adjacent leg portions 52. There are many arrangements for providing the staggered relation of the serpentine conduits with respect the airflow, some of which are represented by Figures 18 to 20 inclusive, and of which there are many other examples.

The heat exchange device 50 is provided with a plurality of the continuous tube serpentine conduits 51 which are suitably supported within the bracket members 54a. An inlet header 55 is provided into which the ends of the vertically aligned end portions of the serpentine conduits 51 extend. The opposite ends of the serpentine conduits 51 extend into an outlet or drain header 56. The arrangement is such that liquid circulates through the plurality of adjacent serpentine conduits 51 in parallel relation from the inlet header 55 to the outlet header 56. An inlet opening 57 is provided in the inlet manifold 55 and an outlet opening 58 is provided in the outlet manifold 56.

The return bend portions 54 are adapted to have one end thereof in communication with a leg portion 52 of one of the serpentine conduits 51 and has the opposite end thereof in communication with a drain header 60. The leg portion 52 which lies adjacent the leg portion to which the end of the return bend 54 is connected has the end thereof in communication with the drain header 60. The drain header 60 is adapted to interconnect the vertically aligned and adjacent leg portions of the plurality of serpentine conduits 51 and the vertically aligned end portions of the return bends 54, whereby fluid interconnection is provided between the return bends 54 and their adjacent leg portions 52 to provide a substantially continuous fluid circulation through the heat exchange device 50. The return bend portions 54 are arranged upon a declining angle from the leg portion 52 to which they are attached toward the drain header 60 whereby fluid within the return bend 54 will be drained toward the header 60.

The heat exchange device 50 is adapted to be arranged upon an angle with respect to a horizontal plane and is pitched in a longitudinal direction toward the end upon which the drain headers 60 are positioned. Such an angle of inclination for the heat exchange device 50 provides an arrangement whereby all the fluid within the heat exchange device is directed toward the end thereof upon which the drain header 60 is mounted. Since the leg portions 52 of the continuous serpentine conduits 51 are arranged upon the declining angle toward the drain header 60, and since the return bends 54 are also arranged upon a declining angle toward the drain header 60, it may be seen that all fluid within the heat exchange device may be drained from the leg portions 52 interconnected by a return bend 54.

A suitable drain opening 61 is provided in the lower end of the drain header 60 and is closed by means of a plug (not shown) when the heat exchange device is in active use. Any number of the drain headers 60 may be used and are arranged in the same manner as heretofore described with regard Figures 1 to 3 inclusive, in that the most advantageous positioning of the headers is selected according to the least number of headers which may be used to drain the portions of the heat exchange device in which fluid may be trapped.

An air vent 62 may be provided in the uppermost portion of the drain header 60 to prevent air logging of the coil. This vent 62 is closed by means of a suitable plug (not shown) when the heat exchange device is in active use.

Figures 18 to 20 inclusive, show other modified arrangements of the positioning of the heat exchange conduits in staggered relation with respect the airflow through the heat exchange device, as well as other arrangements for interconnection of the leg portions of the serpentine conduits of the heat exchange device. In all of the modifications, the drain header 60 is so positioned that it will drain an adjacent pair of leg portions and a return bend when the heat exchange device is pitched longitudinally toward the end upon which the drain header is located.

As disclosed in Figure 6, there is shown a modified arrangement of the positioning of the drain header 20 with respect the leg portions 12 and the return bend portions 25. In this arrangement an elbow 34 is used to interconnect the drain header 20 with one of the leg portions 12 of the serpentine of the conduit 11.

In the modified arrangement, disclosed in Figure 7, the drain header 20 is connected to the leg portions 12 of the serpentine of the conduit 11 by means of short elbow portions 35 arranged with respect to the header 20 of the leg portions 12, to position the header 20 intermediate the leg portions 12.

As disclosed in Figure 8, a further modification of a means for draining the return bend portions of the serpentines is provided. In this arrangement the vertically adjacent return bend portions 25a are interconnected by means of a conduit 36. The lowermost return bend portion 25a is provided with a drain opening 37 which may be plugged in a suitable manner when the heat exchange device is in active use. The conduits 36 provide means for permitting gravity draining of a fluid from one return bend to another until the entire section, served by the conduits, is drained of fluid.

While the form of the apparatus as disclosed in this invention is a preferred form, yet it is to be understood that the inventive feature can be used in connection with other forms and serpentine arrangements of heat exchange devices than those disclosed in the drawings, it being the purpose of the invention to drain fluid from the hairpin loops of a serpentine coil which tend to trap fluid therein when the coil is being drained of fluid. Further, the heat exchange device may be definitely pitched in a direction tending to trap fluid within certain portions of the serpentine conduits, and wherein means will be provided to drain the fluid from the serpentine portions in which the fluid tends to trap thereby insuring drainage of the entire heat exchange device.

It is also to be understood that the invention is not limited to a form of a heat exchange device which is to be definitely pitched in one direction or the other. This invention also comprehends an arrangement wherein each of the return bends of the heat exchange device are provided with means for draining the adjacent leg portions of the hairpin loops formed by the interconnection of the leg portions by the return bend. While the preferred form of the apparatus is such as to pitch the heat exchange device longitudinally toward one end upon which the drain headers will be mounted, yet the heat exchange device could be arranged in a level condition and drain means be provided upon each of the return bends at both ends of the heat exchange device so that fluid could drain toward both ends of the coil at the same time, since all of the return bends would be connected to a drain means.

If means are provided upon each of the return bends forming the heat exchange device it will not be necessary to instruct that the device be definitely pitched in one direction upon installation thereof, but since all of the return bends are drainable the heat exchange device may be positioned at most any angle upon installation and insurance be retained as to drainage of all of the serpentine conduits.

Having thus fully described my invention, what I claim as new and desire to secure by Letters Patent, is:

1. A heat exchange device comprising a plurality of U-shaped tubes disposed nearly horizontally in spaced parallel nearly horizontal relation, a plurality of said tubes being superposed in vertical relation, an independent header for vertically interconnecting every other row of vertically adjacent leg portions of said U-shaped tubes, return bend portions horizontally connecting the adjacent leg portions to the independent header, said return bend portions being arranged upon a declining angle from the leg portion toward the header, the conduits formed by the interconnection of the U-tubes having their opposite ends connected to an inlet and outlet manifold, said heat exchange device being inclined from the horizontal in the direction of the straight length of said leg portions with said headers being positioned at the lower end of the inclined leg portions, and means in the bottom wall of each of said headers for draining the same.

2. A heat exchange device for circulating a freezeable liquid in a closed circulating system comprising, a plurality of U-shaped conduits positioned near horizontally and arranged side by side in a common nearly horizontal plane, the open ends of the U-shaped conduits being all arranged in the same direction, a chamber connected to a leg of one of said conduits, return bend means connecting said chamber to the adjacent leg of the adjacent conduit and arranged upon a declining angle toward said chamber, an inlet and an outlet for the interconnected conduit assembly, said conduit assembly being tilted below the horizontal in the direction of the straight lengths of the conduits to position the chamber at the lower extremity of said leg portions to permit liquid to drain from leg portions adjacent thereto into said chamber, and a normally closed outlet for said chamber constructed and arranged to be opened to drain said chamber.

3. A heat exchange device comprising a plurality of U-shaped tubes disposed nearly horizontally in spaced parallel nearly horizontal relation, a plurality of said tubes being superposed in vertical relation, return bends and an independent header disposed between adjacent leg portions of said U-shaped tubes to vertically interconnect every other row of vertically adjacent leg portions of said tubes, the conduits formed by the interconnection of the U-tubes having their opposite ends connected to an inlet and outlet manifold, said heat exchange device being inclined from the horizontal in the direction of the straight length of said leg portions with said headers being positioned at the lowermost end of the inclined leg portions, and means in said headers to drain the same.

JOHN McELGIN.